Dec. 19, 1922.

A. S. LYHNE.
WEATHERPROOF BATTERY CASE.
FILED FEB. 12, 1921.

1,439,430.

INVENTOR.
Anker S. Lyhne
BY
F. M. Wooster, ATTORNEY

Patented Dec. 19, 1922.

1,439,430

UNITED STATES PATENT OFFICE.

ANKER S. LYHNE, OF BRIDGEPORT, CONNECTICUT.

WEATHERPROOF BATTERY CASE.

Application filed February 12, 1921. Serial No. 444,594.

*To all whom it may concern:*

Be it known that I, ANKER S. LYHNE, a citizen of the United States, residing at Bridgeport, county of Fairfield, State of Connecticut, have invented an Improvement in Weatherproof Battery Cases, of which the following is a specification.

This invention relates to battery covers and more particularly to covers for supporting and protecting batteries to be used for lighting, signals, or other similar purposes on bicycles, pleasure boats, or in similar out-of-door situations. The ordinary dry cell of commerce while sufficiently economical and otherwise well suited for such uses is awkward to support in desired position and cannot maintain its efficiency if exposed to the weather. Hitherto casings have been made carrying low voltage lamps directly attached; but it is frequently desirable to locate the battery remote from the lamps, as when used for bicycle lights. Also, the battery may be required for purposes other than lighting, such as for ringing bells, or for ignition in internal combustion engines, or for a great variety of purposes other than illumination in the immediate vicinity of the battery. I have devised a cover for such batteries which provides means for conveniently clamping the battery in whatever position it may be needed, as, for instance, to a bicycle frame. This casing protects the battery from the weather and carries terminals similar to the ordinary battery terminals, permitting the battery to be connected up with the circuit in the usual manner and to be used for whatever purpose required; and in addition the casing carries a switch for throwing the current on and off, thus rendering a switch in the circuit unnecessary. In carrying out my invention I have devised the apparatus described in the following specification and illustrated in the accompanying drawing, of which—

Figure 2:
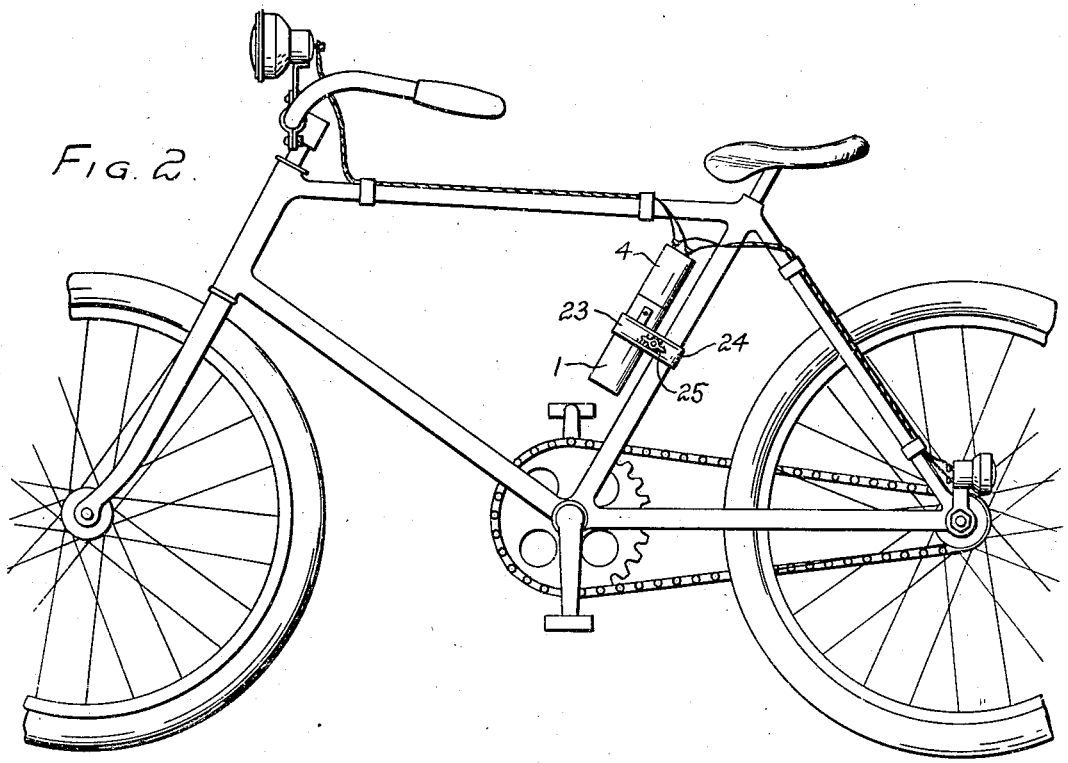
Figure 1:
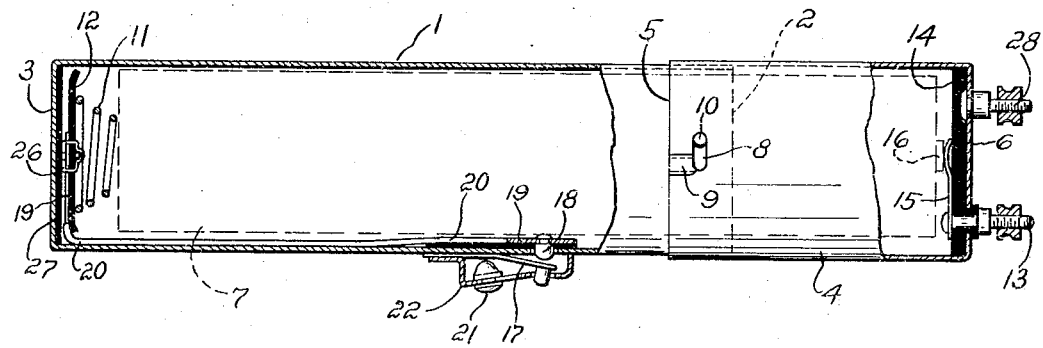

Figure 1 is a side view of the battery casing showing certain parts in section, and Figure 2 is a view of the casing as secured to the frame of a bicycle with its terminals connected to the lighting circuit.

1 denotes a battery container, comprising a cylindrical casing member open at one end 2 and closed at the other end 3. Another casing 4, also cylindrical and open at one end 5 and closed at the other end 6, constitutes a cap for the battery and is made of slightly larger diameter than casing 1 so as to enable the end 5 to telescope over the end 2 after the battery 7 has been inserted in casing 1. Casings 1 and 4 are both made of sheet metal. In casing 4 adjacent open end 5 is a transverse slot 8 and between slot 8 and end 5 is a channel 9 formed by raising a portion of the material of which the casing is formed. Adjacent the open end 2 of casing 1 is a pin 10, which is short enough to permit the channel 9 to be slipped over it. Casing 4 is then turned and the engagement of the slot 8 and pin 10 prevents the two casings from separating. A spring 11 in closed end 3 of casing 1 exerts a longitudinal thrust upon battery 7, causing pin 10 and slot 8 to bind, thereby locking the casings in position.

The ordinary insulating cover with which battery 7 is provided serves to insulate the shell of the battery from the metal casing. Spring 11 bears upon the bottom of battery 7, which portion is not provided with insulating material, or from which the insulation has been removed. Spring 11 is supported upon a base 12, in the form of a disc of insulating material, and this base is secured to the spring 11 by means of a short stud 26. The stud extends through base 12 and is mechanically and electrically connected to spring 11.

Casing member 4 is provided with terminals 13 and 28. Terminal 28 is grounded in the casing 4 and terminal 13 is electrically connected with the central pole of the battery by conducting strip 15, which contacts with the central pole as at 16. An insulating disc 14 insulates end 6 of casing 4 from strip 15 and from the end of the battery, a portion of the disc 14 surrounding terminal 13 where the latter passes through end 6.

Casing member 1 is provided with a circuit closer or switch, comprising a spring contact member 17 grounded in casing 1 and normally out of contact with contact member 18 which is connected to stud 26 beneath base 12 by conducting strip 19. The latter is insulated from the wall of the casing by insulating material 20, and from the end of the casing by insulating disc 27. Contact member 17 and terminal 28 are always electrically connected when the casing is assembled, the former being grounded in casing member 1 and the latter in casing member 4, the casing members being of conducting material and in electrical contact. Temporary contacts may be made by pressing member 17 against member 18, thus closing the circuit, and if it is desired to leave the current on, retaining button 21 is advanced in guide 22, thereby exerting a camming action on member 17 and holding the latter in contact with 18. A strap 23 of sheet metal is secured to casing member 1 by welding or brazing and its ends 24 are formed to constitute a clamp which may be brought together by means of a clamping screw 25, and thus secure the casing and battery to any convenient support.

What I claim is:

1. A weatherproof battery cover, comprising two weatherproof casing members for enclosing the battery, one of said casing members telescoping over the other, means for securing said members together, a pair of terminals carried by one of said members one of which terminals is grounded on said member and the other insulated therefrom, both of which terminals are accessible from the exterior of the casing and adapted for the removable attachment of conductors thereto, means contacting with the positive and negative poles of the battery respectively, one of which contacting means is electrically connected with said insulated terminal and the other adapted to be grounded on said cover.

2. A weatherproof battery cover, comprising two weatherproof casing members for enclosing the battery, one of said casing members telescoping over the other, means for securing said members together, a pair of terminals one of which terminals is grounded on said member and the other insulated therefrom, both of which terminals are accessible from the exterior of the casing and adapted for the removable attachment of conductors thereto, means contacting with the positive and negative poles of the battery respectively, one of said contacting means being electrically connected with said insulated terminal, conducting means connected with the other contacting means, and a switch member adapted to contact with said conducting means and grounded on one of said casing members.

3. A weatherproof battery cover, comprising two weatherproof casing members for enclosing the battery, one of said casing members telescoping over the other, means for securing said members together, a pair of terminals carried by one of said members one of which terminals is grounded on said member and the other insulated therefrom, both of which terminals are accessible from the exterior of the casing and adapted for the removable attachment of conductors thereto, means contacting with the positive and negative poles of the battery respectively, one of said contacting means being electrically connected with said insulated terminal and the other adapted to be grounded on said cover, and means carried by one of said members for securing said cover to an external support.

4. A weatherproof battery cover, comprising two weatherproof cylindrical casing members of conducting material for enclosing the battery, one of said casing members telescoping over the other, means for detachably connecting said members, a spring adjacent the closed end of one of said members for exerting a longitudinal thrust upon the battery, causing said means to remain in attached position, and also affording electrical contact with the shell of said battery, insulating means between said spring and the casing member, a switch carried by the casing member, one pole of the switch being grounded therein, conducting means between the other pole of said switch and said spring, the casing member covering the end of the battery opposite said spring having means contacting the central pole of the battery, two terminals on last said casing member, one being grounded therein and the other insulated therefrom and both of which terminals are accessible from the exterior of the casing and adapted for the removable attachment of conductors thereto, and conducting means between the insulated terminal and said means contacting with the central pole of the battery.

In testimony whereof I affix my signature.

ANKER S. LYHNE.